United States Patent [19]

Shimomura

[11] Patent Number: 4,486,367
[45] Date of Patent: Dec. 4, 1984

[54] PROCESS FOR PRODUCING POLYURETHANE-FOAM MOLDINGS, AND APPARATUS FOR SAME

[75] Inventor: Kenji Shimomura, Yokohama, Japan
[73] Assignee: Ikeda Bussan Co., Ltd., Yokohama, Japan
[21] Appl. No.: 534,908
[22] Filed: Sep. 22, 1983

Related U.S. Application Data

[63] Continuation-in-part of Ser. No. 278,121, Jun. 29, 1981, abandoned.

[51] Int. Cl.³ ............................................. B29D 27/04
[52] U.S. Cl. ...................................... 264/39; 264/51; 264/236; 264/347; 264/338; 425/225; 425/261; 425/451; 425/817 R
[58] Field of Search ...................... 264/39, 46.6, 51, 54, 264/236, 347, 338, DIG. 83; 425/4 R, 4 C, 225, 261, 259, 547, 548, 817 R, 817 C, 451

[56] References Cited

U.S. PATENT DOCUMENTS

| | | | |
|---|---|---|---|
| 1,297,917 | 3/1919 | Schmitt | 425/261 X |
| 2,369,593 | 2/1945 | Marks et al. | 264/236 X |
| 2,908,943 | 10/1959 | Miller | 264/46.6 |
| 3,131,242 | 4/1964 | Petri | 264/236 X |
| 3,243,491 | 3/1966 | Bethe | 425/817 R X |
| 3,432,581 | 3/1969 | Rosen | 264/54 X |
| 3,712,771 | 1/1973 | White et al. | 425/4 R X |
| 3,813,463 | 5/1974 | Conger | 425/817 R X |
| 4,075,301 | 2/1978 | Oswald | 264/51 X |

FOREIGN PATENT DOCUMENTS

| | | | |
|---|---|---|---|
| 28718 | 5/1981 | European Pat. Off. | 425/817 R |
| 2114307 | 10/1972 | Fed. Rep. of Germany | 425/261 |
| 2249719 | 4/1973 | Fed. Rep. of Germany | 425/259 |

Primary Examiner—Philip Anderson
Attorney, Agent, or Firm—Jordan and Hamburg

[57] ABSTRACT

Process for producing polyurethane-foam moldings and apparatus for the same; the polyurethane-foam moldings are produced through the steps of pre-treating molds and injecting a foamable polyurethane resin reaction mixture into the molds; carrying the molds with the foamable polyurethane resin reaction mixture injected therein to a reservoir tank containing a heated liquid such as hot water or oil and dipping them into the liquid; and carrying the dipped molds out of the reservoir tank and opening them to take out the moldings thus produced. Such process for production of polyurethane-foam moldings is carried out by an apparatus in which a conveyance machine is so arranged as to delineate a circular orbit, in a normal plane, along which it moves circulating; molds in pairs are fixed to the conveyance machine along the length thereof at regular intervals; a reservoir tank is provided which accommodates a lower portion of the rotating orbit of the conveyance machine; said reservoir tank being filled with a heated liquid; thus molds pass through the liquid; and along the upper rotating orbit of the conveyance machine, the foamable polyurethane resin reaction mixture is put into the molds while moldings are taken out of the molds which have thus followed a cycle of production along the entire orbit of the conveyance machine. Further, in various apparatuses which can realize the above-described process of production, the molds used have the edges extending downward when the molds are in the liquid and the outer ends so bent as to extend horizontally.

10 Claims, 8 Drawing Figures

PROCESS FOR PRODUCING POLYURETHANE-FOAM MOLDINGS, AND APPARATUS FOR SAME

CROSS REFERENCE TO THE RELATED APPLICATION

This is a continuation in part application of Ser. No. 278,121 filed on June 29, 1981 and now abandoned.

BACKGROUND OF THE INVENTION

1. Field of the Invention

The present invention relates to polyurethane-foam moldings, and more particular to a process, and an apparatus, for producing polyurethane-foam moldings having, at one side thereof, a concave and convex solid contour and which can be advantageously adopted as cushion material in automotive seats.

2. Description of the Prior Art

Heretofore, polyurethane-foam moldings are generally produced with the process comprising of sufficiently mixing polyester and activator, adding tolylenediisocyanate to the mixture, further agitating it into a foamable polyurethane resin reaction mixture, putting this mixture into molds and heating them. Many different formulations for producing polyurethane-foam moldings have been proposed, some of which are, best-known, a formulation of polyester in 100 parts composed of adipic acid in 15 mols, diethylene glucol in 16 mols and trimethylol propane in 1 mol, tolylene diisocyanate in 36 parts and activator in 6 parts, and ones using, as base polymer, other than polyester, namely, polyalkylene ether produced by polymerizing and adding ethylene oxide, propylene oxide and butylene oxide to glycerine or sorbitol. By preparing a foamable polyurethane resin reaction mixture from compounding of diisocyanate and activator with polyester or polyalkylene ether as base polymer, and putting the resin reaction mixture in molds which are so shaped as to provide a desired contour, the polyurethane foam can be molded in a product which has a same contour as desired. In the prior-art process, however, no moldings of intended or desired properties will not possibly be obtained depending upon the mold heating conditions when foaming and curing the foamable polyurethane resin reaction mixture within the molds. This mold heating generally consists of carrying the molds into a hot-air oven, electric oven, infrared-ray oven, or the like kept at a predetermined temperature, and making them stay there for a predetermined period of time. However, such heating ovens are disadvantageous in that it takes a long time to raise the temperature and the temperature distribution is not uniform. Consequently, the molds cannot be evenly heated, and required heating time is long, thus the efficiency of production is low.

SUMMARY OF THE INVENTION

Accordingly, the present invention has a primary object to overcome the above-described drawbacks of the prior-art process by providing a process for producing polyurethane-foam moldings in a reduced period of time and with a high efficiency by dipping a foamable polyurethane resin reaction mixture within molds into a heated liquid where it is foamed and cured, thereby permitting to uniformly heat the molds as a whole.

The present invention has another object to provide an apparatus for producing polyurethane-foam moldings, which requires only a reduced space of installation, is easy to operate and can produce massively such polyurethane-foam moldings with an improved efficiency.

The present invention has yet another object to provide an apparatus for producing polyurethane-foam moldings, in which molds are so designed in shape as to permit, when the molds are dipped in a liquid, to prevent the liquid from entering the inside of the molds as much as possible without using any sealing material.

The first object of the present invention is attained by providing a process for producing polyurethane-foam moldings, according to the present invention, comprising the steps; pre-treating molds carried by a conveyance machine provided as connected to a reservoir tank, supplying a foamable polyurethane resin reaction mixture into the molds, carrying them by the conveyance machine to the reservoir tank which contains a heated liquid such as hot water or oil, dipping the molds into the liquid within the reservoir tank for a predetermined period of time to foam and cure the foamable polyurethane resin reaction mixture in the molds, and opening the molds having been passed through the inside of the reservoir tank by the conveyance machine, to thus obtain a molding from the molds.

The second object of the invention, having just been described above, is attained by providing an apparatus for producing polyurethane-foam moldings, according to the present invention, in which a conveyance machine is so arranged as to delineate a circular orbit, in a normal plane, along which it moves rotating; molds in pairs are fixed to the conveyance machine along the length thereof at regular intervals; a reservoir tank is provided which accomodates a lower portion of the rotating orbit of the conveyance machine; said reservoir tank being filled with a heated liquid; thus the molds pass through the liquid; and along the upper rotating orbit of the conveyance machine, a foamable polyurethane resin reaction mixture is put into the molds while moldings are taken out of the molds which have thus followed a cycle of production along the entire orbit of the conveyance machine. That is to say, with the inventive apparatus, it is possible to produce polyurethane-foam moldings when the conveyance machine rotates once along the entire orbit.

The third object of the present invention is attained by providing an appparatus for producing polyurethane-foam moldings in which molds containing a foamable polyurethane resin reaction mixture are carried by the conveyance machine into the heated liquid within the reservoir tank, thus foaming and curing the foamable polyurethane resin reaction mixture within the molds, characterised, in accordance with the present invention, in that the edges of the molds are so formed as to extend downward when the molds come into the liquid and the outer ends of the molds are so shaped as to extend horizontally.

DETAILED DESCRIPTION OF THE PREFERRED EMBODIMENTS

The process for polyurethane-foam moldings according to the present invention can be realized by using any of the apparatuses and molds illustrated in FIGS. 1 to 8. This process according to the present invention will be described along with the polyurethane-foam molding producing apparatus shown in FIGS. 1 to 3.

Figure 1:
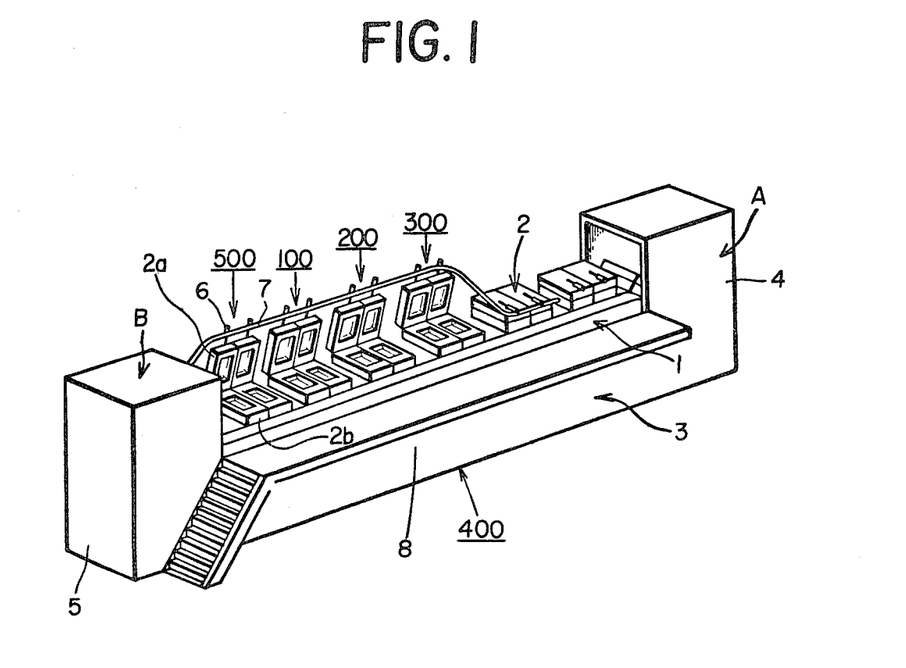
FIG. 1 is a general external view of the first embodiment of the present invention.
Figure 2:
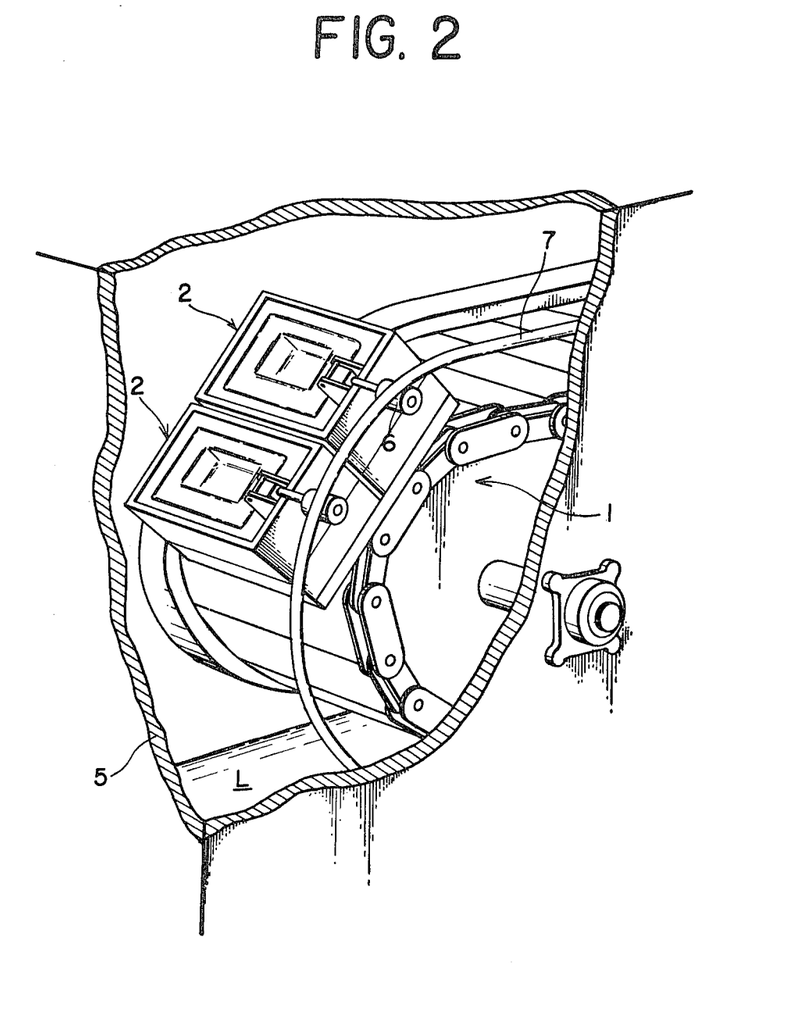
FIG. 2 is a perspective, partially fragmentary, view of the rotary section.
Figure 3:
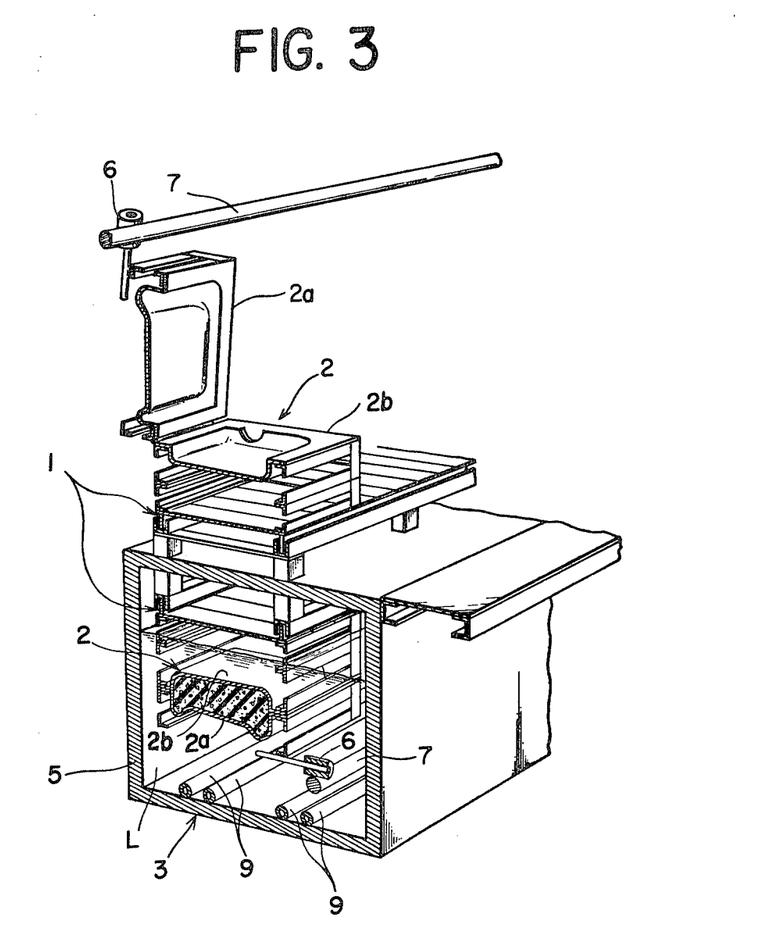
FIG. 3 is an axial sectional view, taken nearly at the center, of the first embodiment in FIG. 1 according to the present invention.

In the apparatuses illustrated in FIGS. 1 to 3, a conveyance machine which rotates in one direction is generally shown at a numeral 1; this machine uses an endless chain belt. A plurality of molds 2 is fixed to the machine 1 under the opposite rotary sections A and B of which is provided a reservoir tank 3 in which a heated liquid L such as hot water or oil. The conveyance machine 1 is so laid as to pass through the liquid L. Further, along a portion of the conveyance machine 1 which is above the reservoir tank 3, the molds 2 on the machine 1 having passed by the rotary section B are opened at the upper mold 2a thereof; foamed and cured moldings are taken out of the molds (take-out process 500). After being cleaned, the molds 2 are applied with a mold release (mold release-application process 100), then predetermined insert is put in the molds (insertion process 200). After that, a predetermined amount of foamable polyurethane resin reaction mixture is injected into the molds 2 (injection process 300). The molds 2 are let to pass by the rotary section A into the reservoir tank 3, then dipped into the heated liquid L (dipping process 400). The foamable polyurethane resin reaction mixture within the molds 2 having passed through the final dipping process 400 are foamed and cured to provide a molded foam of a contour corresponding to the inner geometrical contour of the molds 2.

The pair of molds 2 includes an upper mold 2a and lower mold 2b, the upper mold 2a being openable. Opening of this upper mold 2a of the molds 2 in said take-out process 500 and closing thereof after leaving said injection process 300 are automatically effected as a lever 6 of the upper mold 2a is guided by a guide bar 7. As seen in FIG. 2, the guide bar 7 is in contact with the lever 6, at the upper side thereof, of the molds 2 which are carried within the reservoir tank 3 and along the rotary sections A and B. The portion of the lever 6 which slides on the guide bar 7 is made of a roller which rolls on the guide bar. Said rotary sections A and B are convered with casings 4 and 5, as shown in FIG. 1, which are formed integrally with the reservoir tank 3. Provided between these casings 4 and 5 is a passage 8 for worker's use.

As shown in FIG. 3, there is laid within the reservoir tank 3 a plurality of steam pipes 9 which keep the liquid L at a predetermined temperature.

In some cases, no insert is put in the molds 2 in said insertion process 200 depending upon the kind of moldings to be produced; therefore, this process may be eliminated in such case.

According to the process or method of the present invention, the pre-treatment process before the injection process in which foamable polyurethane resin reaction mixture is injected into the molds 2, consists of said mold release-application process 100, insertion process 200 and various mold treating processes executed as needed; this pre-treatment process is followed by said injection process in which, as mentioned above, the foamable polyurethane resin reaction mixture is injected into the molds. Following the injection process is said dipping process in which the molds having injected therein the foamable polyurthane resin reaction mixture are carried by the conveyance machine 1, connected with the reservoir tank 3, into the latter and dipped in the heated liquid L such as hot water or oil. The molds 2 having passed through this dipping process 400 are further carried by the conveyance machine 1 to come out of the reservoir tank 3 and enter the take-out process 500 in which the molds 2 are opened at the upper mold 2a thereof for take-out of a molding thus produced. Namely, at this point of the production line, polyurethane-foam moldings of an intended shape and properties are obtained.

The process for production of polyurethane-foam moldings using the apparatus illustrated in FIGS. 1 to 3 will be described in further detail. The Applicant of the present invention used, as the molds 2, aluminum-made molds of 13 liters of capacity, injected into the molds a foamable polyurethane resin reaction mixture in the following formulation, dipped the molds into the liquid L under the conditions as in Table 1. And the quality and properties of the products were observed.

| Example of Proportion of Foamable Polyurethane Resin Reaction Mixture | |
| --- | --- |
| Components | Part in Weight |
| Polypropylene glycol | 100 |
| Tolylene | 48 |
| Water | 3.6 |
| Silicon oil | 0.5 |
| Catalyst | 0.3 |
| Freon-12 | 5.0 |

In Table 1, the compound Nos. 5 and 6 are those consisting of the previously-mentioned foamable polyurethane resin reaction mixture and a flame-retardant. As seen from this Table 1, polyurethane-foam moldings of high quality can be obtained under the conditions of more than 85° C. in temperature of the liquid L and of 5 to 7 min in dipping time. Also, the compounds containing the flame-retardant can be formed into quality moldings in a dipping time of about 7 min. Note the water was used as the liquid L.

Next, the Applicant of the present invention effected experiments on moldability with change in hardness of the compounds; the experiment results are shown in Table 2.

The first embodiment according to the present invention provides a circulatory dipping system in which the molds 2 are circulated by the conveyance machine 1, and passed through the heated liquid L within the reservoir tank 3, thereby curing the foamable polyurethane resin reaction mixture.

TABLE 1

| Item | Compound Nos. | | | | | | | |
|---|---|---|---|---|---|---|---|---|
| | 1 | 2 | 3 | 4 | 5 | 6 | 7 | 8 |
| Dipping time (sec) | 120 ± 10 | 180 ± 10 | 240 ± 10 | 300 ± 10 | 300 ± 10 | 420 ± 10 | 360 ± 10 | Same as left |
| Liquid temperature (°C.) | 88 ± 3 | | | Same as left | | | 75 ± 2 | 80 ± 2 |
| Mold temperature at time of injection (°C.) | 40 ± 5 | | | | Same as left | | | |
| Mold temperature (upper) at time of mold (lower) releasing (°C.) | 73 ± 3 / 76 ± 3 | | | Same as left / Same as left | | | 55 ± 3 / 60 3 | 60 ± 3 / 68 3 |
| Temperature of polyurethane solution (°C.) | 23 ± 3 | | | | Same as left | | | |
| Curability | x | Δ | ○ | ◎ | x | ◎ | x | x |
| Appearance of foam | Loose skin | | | Good | Loose skin | Good | | Loose skin |
| Mold releasability | | | Poor | Good | Poor | Good | | Impossible |
| Decision | x | x | ○ | ○ | x | ○ | x | x |

TABLE 2

| Item | Compound Nos. | | | | | |
|---|---|---|---|---|---|---|
| | 1 | 2 | 3 | 4 | 5 | 6 |
| Dipping time (sec) | 420 ± 10 | | | Same as left | | |
| Hardness of compound | 7.5 | 9 | 10 | 12 | 14 | 18 |
| Liquid temperature (°C.) | | 88 ± 3 | | Same as left | | |
| Mold temperature at time of injection (°C.) | | | | | | |
| (upper) | | 40 ± 5 | | Same as left | | |
| (lower) | | 40 ± 5 | | Same as left | | |
| Mold temperature at time of releasing (°C.) | | | | | | |
| (upper) | | 73 ± 3 | | Same as left | | |
| (lower) | | 78 ± 3 | | Same as left | | |
| Compound temperature (°C.) | | 23 ± 3 | | Same as left | | |
| Curability | ○ | ◎ | ◎ | ◎ | ◎ | ◎ |
| Appearance of foam | Partly loose skin | Good | | Same as left | | |
| Mold releasability | Partly poor | Good | | Same as left | | |
| Decision | x | ○ | ○ | ○ | ○ | ○ |

Figure 4:
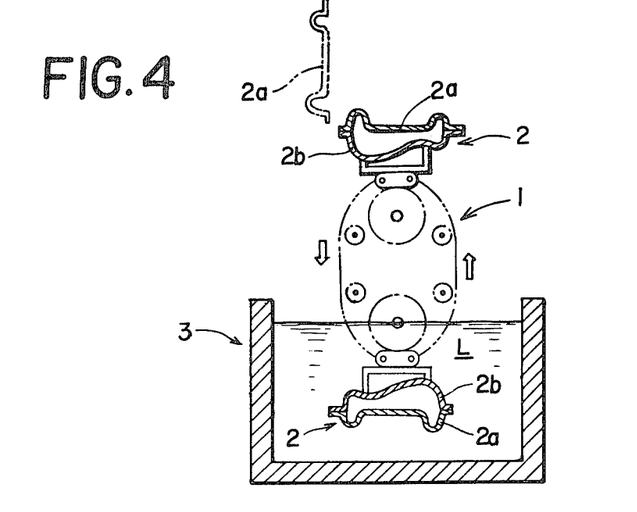
FIG. 4 is a schematic cross section of the second embodiment.
Figure 5:
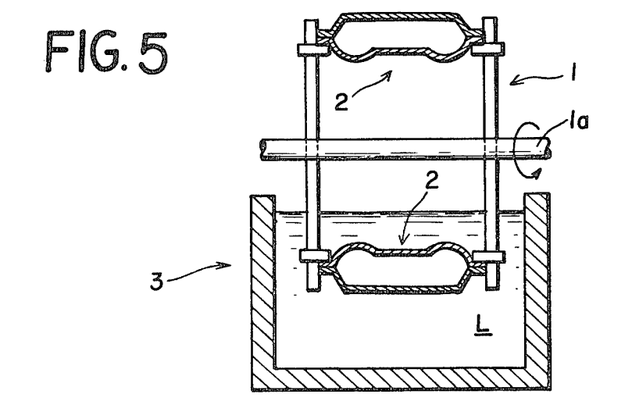
FIG. 5 is a schematic cross section of the third embodiment according to the present invention.

Such circulatory dipping system may be other than that in the first embodiment, namely, be those shown in FIGS. 4 and 5; in the second embodiment shown in FIG. 4, the conveyance machine 1 carries the molds 2 upward, then downward, inverts them, carries them downward and upward all along the rotating orbit. The molds 2 are dipped in the liquid L when they are below the conveyance machine 1, that is to say, they are dependent therefrom. In the third embodiment shown in FIG. 5, the convenance machine 1 causes the upper and lower molds in pair 2a and 2b to be inverted due to the rotation of the rotation shaft 1a of the machine 1. As evident to those skilled in the art, it is common to the first to third embodiments that the reservoir tank 3 is provided under the rotating orbit so that take-out of moldings, pre-treatment and injection of foamable polyurethane resin reaction mixture are performed on the side above the rotating orbit of the conveyance machine 1 and that polyuerthane-foam moldings are obtained when the conveyance machine 1 has rotated one full turn along the rotating orbit. Consequently, the inventive polyurethane-foam molding producing apparatus occupies no large space of installation in the horizontal direction while it can be extended vertically. Thus, the inventive apparatus can be utilized in a narrow site and is superior in efficiency of production. Further, since the one full rotation of the conveyance machine 1 yields polyurethane-foam moldings, such products can be so massively manufactured with a high efficiency that the manufacturing cost can be reduced. In addition, since the molds 2 are dipped in the heated liquid L, so the molds 2 are uniformly heated, thus preventing uneven foaming from occurring; in comparison with the conventional heating of the molds in a heating oven, the foamable polyurethane resin reaction mixture within the molds can be foamed and cured in a nearly half of the time required in the conventional system.

Figure 6:
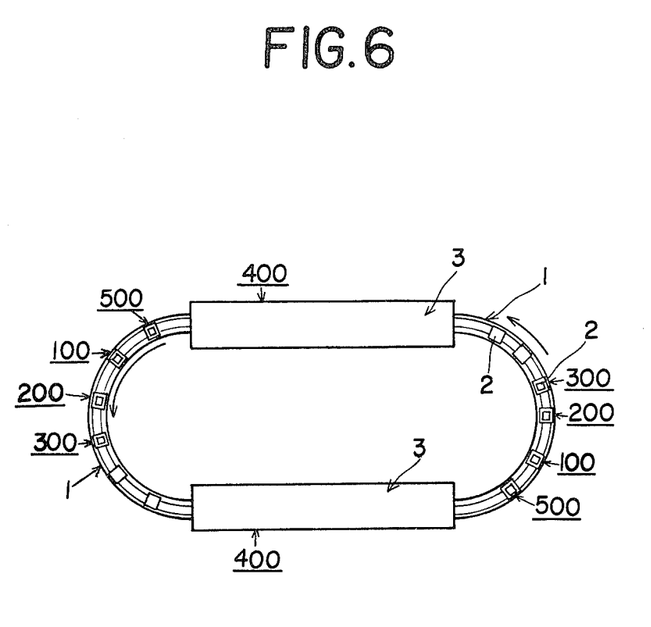
FIG. 6 is a schematic plan view of a further embodiment of the apparatus as a whole according to the present invention.

FIG. 6 shows an apparatus according to the yet another aspect of the present invention, in which the conveyance machine 1 is so arranged as to delineate a rotating orbit in a horizontal plane. With this inventive apparatus, it is possible to produce moldings when the conveyance machine 1 has rotated a half of the orbit, thus yielding two moldings per pair of molds. As in other drawings, in FIG. 6, the reference numeral 2 denotes molds, and 3 indicates a reservoir tank in which a heated liquid L is stored. The section of the conveyance machine 1 which is disposed within this reservoir tank 3 is lower than that section which is outside the tank 3. Accordingly, the molds 2 having passed through the mold release-application process 100, insertion process 200 and injection process 300, are carried by the conveyance machine 1 into the reservoir tank 3. The molds 2 go downward; on the contrary, when they come out of the reservoir tank 3, the molds 2 rise. In this embodiment, the molds 2 will not be inverted within the reservoir tank 3, but obliquely enter the liquid L and are carried in the liquid L with the upper mold 2a kept on upper side. Then, they are carried out of the liquid L in the oblique upward direction. In FIG. 6, the reference numeral 400 denotes the dipping process.

Figure 7:
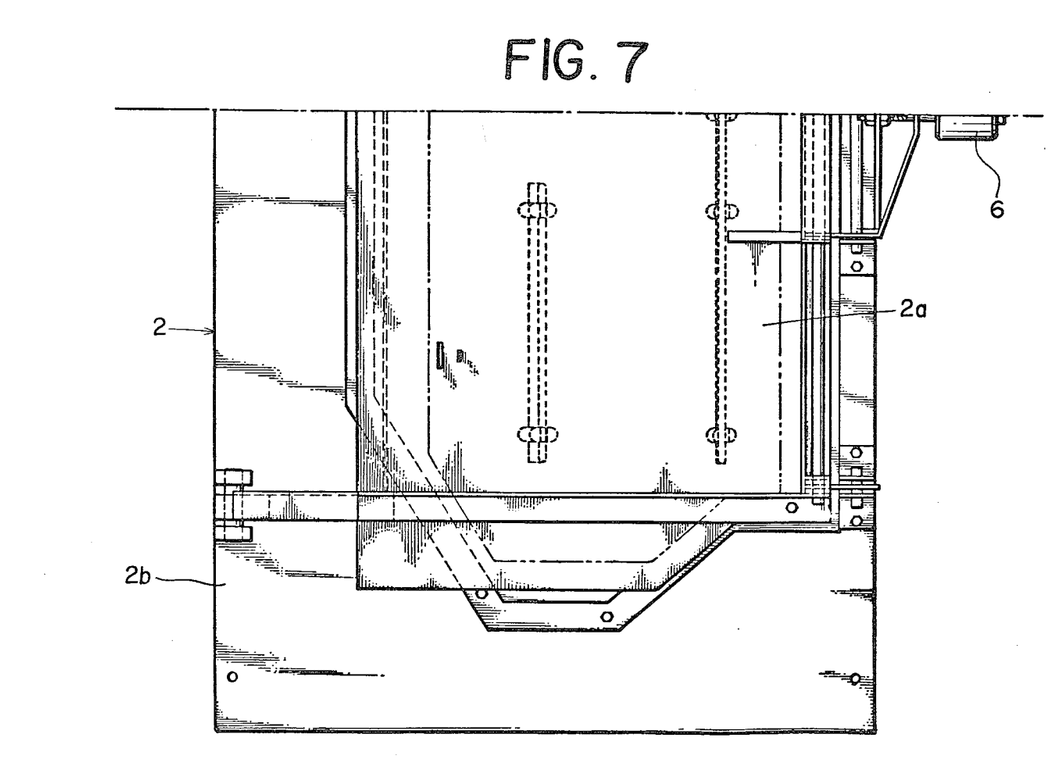
FIG. 7 is a plan view of a pair of molds effectively usable in the apparatus according to the present invention.
Figure 8:
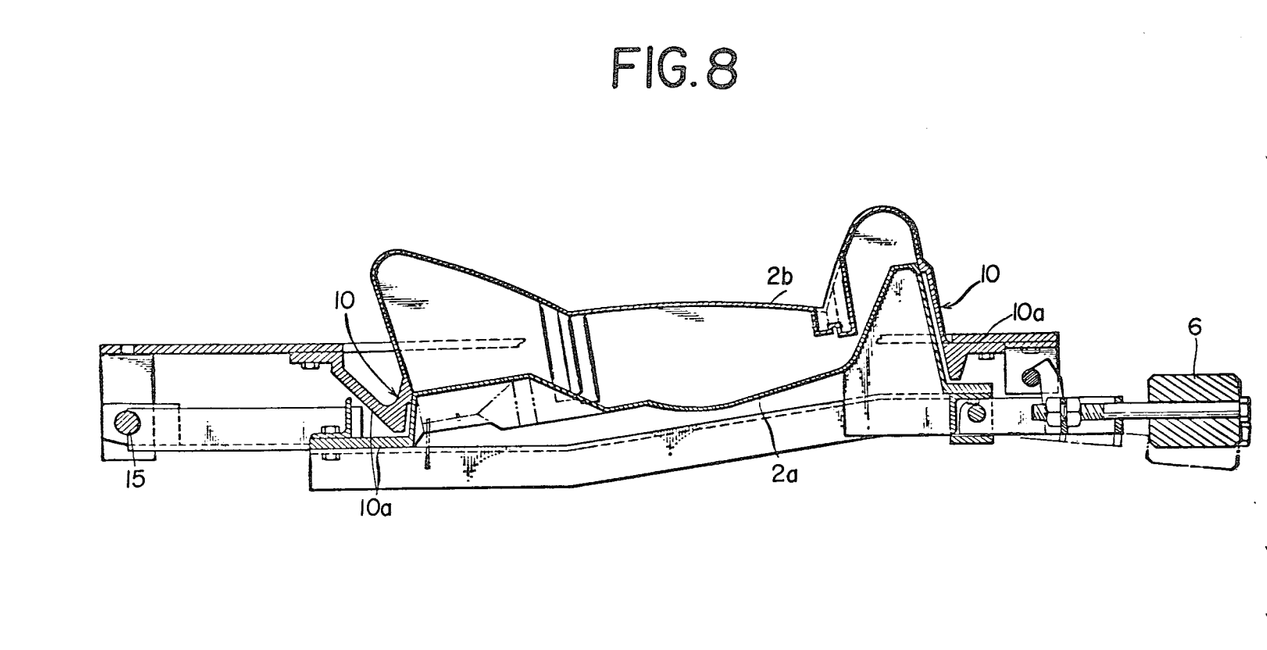
FIG. 8 is an axial section, taken at the center, of the molds in FIG. 7, the molds being in up side down position.

The molds 2 in FIGS. 7 and 8 have the edges 10 extended downward, while the molds 2 are being dipped in the liquid L and outer ends formed as flanges 10a which horizontally extend. This design of the molds can minimize the following possibilities. The edges or rims 10 are overlapped on each other when the molds, upper and lower 2a and 2b are closed in relation to each other, and are apt to incur a clearance. In other words, it is possible for the liquid L to enter the molds 2. Further, the moldings are apt to incur burring at the edges 10.

The molds 2 of such structure can be used un the apparatus shown in FIGS. 1 thru 5, as well as in that shown in FIG. 6 provided that the upper and lower molds 2a and 2b are set in such an inverted relation that the flange 10a may extend below the lower mold 2b.

With the polyurethane-foam molding producing apparatus employing such molds 2, it is possible to prevent the liquid L from entering the molds at the cirumferential edges where the upper and lower molds are overlapped on each other, without using any sealing material.

What is claimed is:

1. A process for producing polyurethane foam moldings, comprising
   (A) arranging two portions of a mold together, said mold portions adapted to be opened and closed with respect to one another, said mold portions having obliquely extending edges which overlap one another when said mold is closed, the edge of one portion extending around said other portion, and the outer ends of both said portions extending substantially horizontally, forming a clearance between said two portions when closed,
   (B) arranging a plurality of said molds on a conveyor,
   (C) pre-treating said molds with a mold release agent
   (D) injecting a foamable polyurethane resin mixture into each mold,
   (E) closing each mold,
   (F) conveying each mold with the foamable polyurethane resin mixture injected therein to a reservoir containing a heated liquid and dipping each mold in said liquid to cure said foamable polyurethane resin mixture, with the overlapping edge portions of said mold portions preventing heated liquid from entering said mold, and
   (G) removing each mold from said reservoir and opening each mold to remove the produced polyurethane foam molding.

2. The process of claim 1 in which in step (F) said molds are inverted when dipped into said heated liquid within said reservoir.

3. The process of claim 2 in which said liquid is heated to a temperature of at least about 85° C.

4. An apparatus for producing polyurethane foam moldings, comprising:
   (A) a conveyor defining a substantially oval orbit in a normal plane,
   (B) a plurality of molds affixed to said conveyor (A) along the length at regular, discrete intervals, said molds each comprising two portions,
     (1) an upper portion, and
     (2) a lower portion,
   said mold portions (B)(1) and (2) adapted to be opened and closed with respect to one another for receiving a foamable polyurethane resin reaction mixture therebetween, said upper and lower mold portions (B)(1) and (2) both having edges extending obliquely which overlap one another when said upper and lower portions (B)(1) and (2) are closed, the edge of said upper portion (B)(1) extending around said lower portion (B)(2), and outer ends of said upper and lower portions (B)(1) and (2) extending substantially horizontally when closed, preventing liquid from entering the mold (B), and,
   (C) a reservoir through which a portion of said conveyor (A) orbits, said reservoir comprising a heated liquid through which said molds (B) pass and said foamable polyurethane resin reaction mixture is cured.

5. The apparatus of claim 4 in which the heated liquid in said reservoir (C) is water or oil.

6. The apparatus of claim 5 additionally comprising (D) means for inverting said molds when passing through said reservoir (C) on said conveyor (A).

7. The apparatus of claim 6 in which said inverting means (D) comprises
   (1) a guide bar along said conveyor (A), and
   (2) a lever on each mold (B), contacting said guide bar (D)(1).

8. The apparatus of claim 6 in which said inverting means (D) comprises an attachment between said mold (B) and said conveyor (A).

9. The apparatus of claim 6 in which said inverting means (D) comprises a rotation shaft on said conveyor (A).

10. A mold for producing polyurethane foam moldings, comprising
    (A) an upper portion, and
    (B) a lower portion,
    said mold portions (B)(1) and (2) adapted to be opened and closed with respect to one another for receiving a foamable polyurethane resin reaction mixture therebetween, said upper and lower mold portions (B)(1) and (2) both having edges extending obliquely which overlap one another when said upper and lower portions (B)(1) and (2) are closed, the edge of said upper portion (B)(1) extending around said lower portion (B)(2) and outer ends of said upper and lower portions (B)(1) and (2) extending substantially horizontally when closed, preventing liquid from entering the mold.

* * * * *